(12) United States Patent
Lewis

(10) Patent No.: US 9,204,595 B2
(45) Date of Patent: Dec. 8, 2015

(54) QUICK CONNECT SYSTEM FOR ATTACHING MOTORS TO CYLINDER MOWERS

(71) Applicant: Textron, Inc., Providence, RI (US)

(72) Inventor: Linton Linn Lewis, Rock Hill, SC (US)

(73) Assignee: Textron Inc., Providence, RI (US)

( * ) Notice: Subject to any disclaimer, the term of this patent is extended or adjusted under 35 U.S.C. 154(b) by 11 days.

(21) Appl. No.: 14/166,917

(22) Filed: Jan. 29, 2014

(65) Prior Publication Data

US 2015/0208577 A1 Jul. 30, 2015

(51) Int. Cl.
| | |
|---|---|
| *A01D 34/00* | (2006.01) |
| *A01D 34/62* | (2006.01) |
| *A01D 34/43* | (2006.01) |
| *A01D 34/56* | (2006.01) |

(52) U.S. Cl.
CPC ............... *A01D 34/62* (2013.01); *A01D 34/43* (2013.01); *A01D 34/56* (2013.01)

(58) Field of Classification Search
CPC ....... A01D 34/62; A01D 34/56; A01D 34/58; A01D 34/60; A01D 34/475; A01D 34/44; A01D 34/47; A01D 69/02
USPC ..................... 403/2; 56/16.9, 16.7, 249, 249.5
See application file for complete search history.

(56) References Cited

U.S. PATENT DOCUMENTS

| | | | | |
|---|---|---|---|---|
| 3,339,215 | A * | 9/1967 | Flood | 4/252.1 |
| 3,846,851 | A * | 11/1974 | Pepper | 4/252.4 |
| 5,412,932 | A * | 5/1995 | Schueler | 56/249 |
| 5,896,734 | A * | 4/1999 | Chesack et al. | 56/249 |
| 5,941,057 | A * | 8/1999 | Chesack et al. | 56/249 |
| 6,029,433 | A * | 2/2000 | Westbrook et al. | 56/249 |
| 6,253,533 | B1 * | 7/2001 | Ehn, Jr. | 56/249 |
| 6,467,245 | B1 * | 10/2002 | Humphrey | 56/249.5 |
| 6,523,334 | B1 * | 2/2003 | Dettmann | 56/11.9 |
| 6,946,762 | B2 * | 9/2005 | Rinholm et al. | 310/66 |
| 7,121,073 | B2 * | 10/2006 | Schmidt et al. | 56/249 |
| 7,231,757 | B2 * | 6/2007 | Poulson et al. | 56/249 |
| 7,530,214 | B1 * | 5/2009 | Rinholm et al. | 56/16.9 |
| 7,647,756 | B2 * | 1/2010 | Rinholm et al. | 56/249 |
| 7,954,179 | B2 * | 6/2011 | Johnson et al. | 4/252.1 |
| 8,899,005 | B2 * | 12/2014 | Pavlich et al. | 56/249 |
| 2002/0095922 | A1 * | 7/2002 | Goman et al. | 56/16.7 |
| 2003/0145570 | A1 * | 8/2003 | Berndt et al. | 56/6 |
| 2008/0196371 | A1 * | 8/2008 | Bryant et al. | 56/7 |

* cited by examiner

*Primary Examiner* — Árpápd Fábián-Kovács
(74) *Attorney, Agent, or Firm* — Polster Lieder

(57) ABSTRACT

The present disclosure provides a motor connection system and method for mounting and removing a motor to and from a reel assembly frame of a turf-care vehicle without the use of tools. In various embodiments, the system includes a plurality of shoulder bolts longitudinally extending from a mounting end of the motor and a bearing housing that is mountable to a reel assembly frame of a turf-care vehicle. The bearing housing includes a plurality of self-tightening keyhole slots structured and operable to receive a respective one of the shoulder bolts. Each keyhole slot comprises a interior bezel that is interoperable with the respective shoulder bolt such that rotation of the motor to a Home position will structurally hold and secure the motor to the bearing housing.

18 Claims, 7 Drawing Sheets

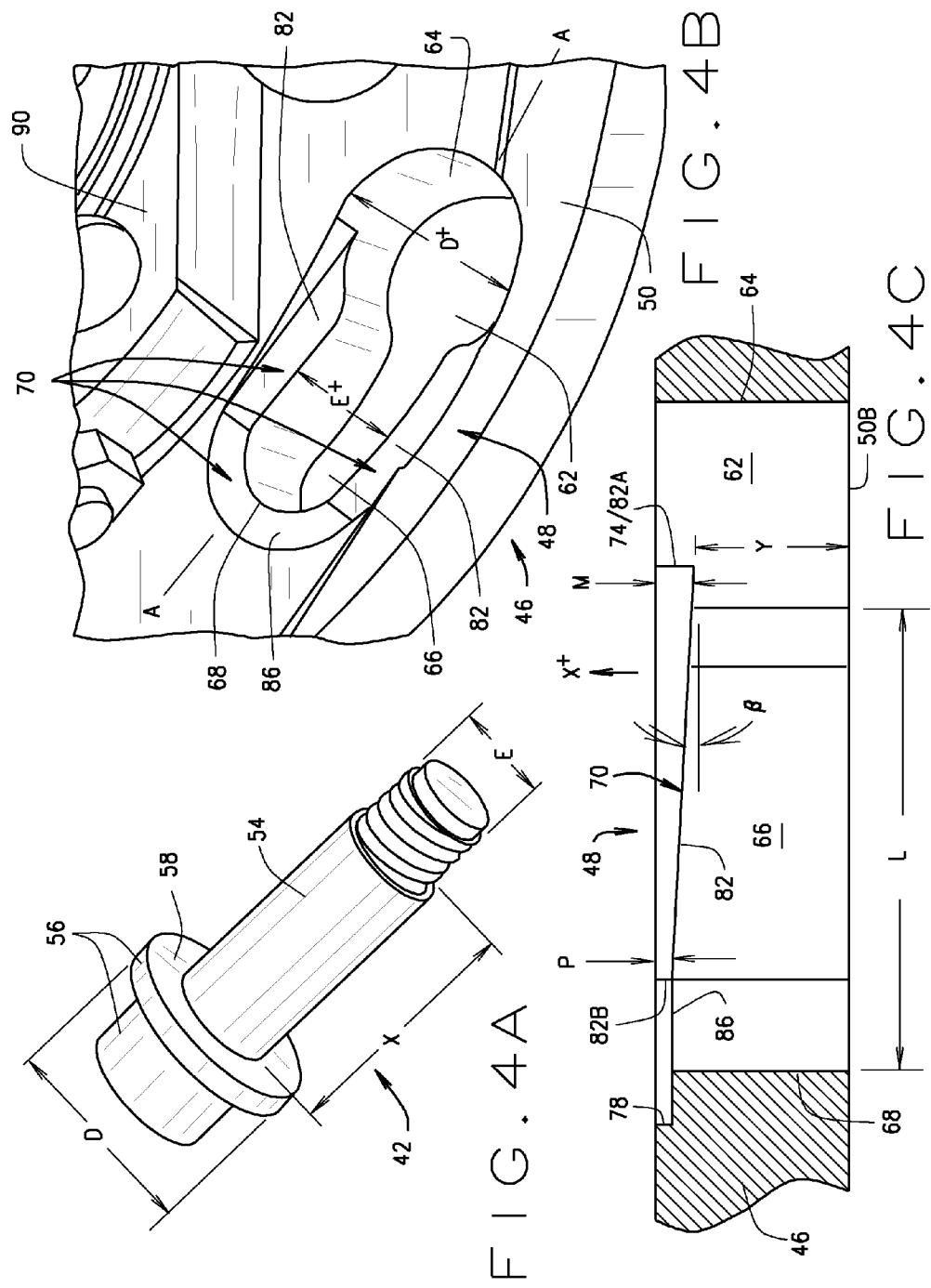

US 9,204,595 B2

QUICK CONNECT SYSTEM FOR ATTACHING MOTORS TO CYLINDER MOWERS

FIELD

The present disclosure provides a connection system and method for quickly and easily mounting and removing a motor to and from a reel assembly frame of a turf-care vehicle without the use of tools.

BACKGROUND

The statements in this section merely provide background information related to the present disclosure and may not constitute prior art.

Commercial turf-care vehicles typically used for cutting, grooming and maintaining grass at golf courses, sporting venues, etc., generally include a reel assembly that comprises a plurality of cutting blades helically disposed about a shaft, e.g., a cylindrical reel, barrel or drum, that is rotationally mounted within a metal frame. In many instances, a motor, e.g., an electric or hydraulic motor, is mounted to the frame of the reel assembly and operably connected to the cylinder to drive the cylinder and cutting blades during grass cutting operation of the respective vehicle.

Typically, in order to perform maintenance on the reel assembly, for example to sharpen the blades, the reel assembly must be removed from the reel assembly suspension system of the vehicle. Moreover, in order to remove the reel assembly, in most instances the motor must first be removed from the reel assembly. Removing the motor typically requires the time consuming use of tools to remove a plurality of bolts that mount the motor to a frame of the reel assembly. Additionally, the mounting bolts can become rusty or damaged over time, which increases the time and effort required to remove and remount the motor from and to the reel assembly frame.

SUMMARY

The present disclosure provides a motor connection system and method for quickly and easily mounting and removing a motor to and from a reel assembly frame of a turf-care vehicle without the use of tools. In various embodiments, the system includes a plurality of shoulder bolts (or shoulder bolt assemblies) connected to and longitudinally extending from a mounting end of the motor. Each shoulder bolt comprises a shaft and a head disposed at a distal end of the shaft. The system additionally includes a bearing housing that is mountable to a reel assembly frame of a turf-care vehicle. The bearing housing includes a plurality of self-tightening keyhole slots disposed therein. Each keyhole slot comprises a ramped interior bezel and is structured and operable to receive a respective one of the shoulder bolts. Each keyhole slot, particularly the ramped interior bezel, is interoperable with the respective shoulder bolt such that rotation of the motor to a Home position will structurally hold and secure the motor to the bearing housing. The system further includes a retaining mechanism that is structured and operable securely retain the motor in the Home position during operation of the turf-care vehicle.

Further areas of applicability of the present teachings will become apparent from the description provided herein. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIG. 4A is an isometric view of a shoulder bolt of the motor connection system shown in FIG. 3, in accordance with various embodiments of the present disclosure.

FIG. 4B is an isometric view of a self-tightening keyhole slot of a bearing housing shown in FIG. 3, in accordance with various embodiments of the present disclosure.

FIG. 4C is a cross-sectional view of the self-tightening keyhole slot shown in FIG. 4B, along line A-A, in accordance with various embodiments of the present disclosure.

DETAILED DESCRIPTION

Figure 1:
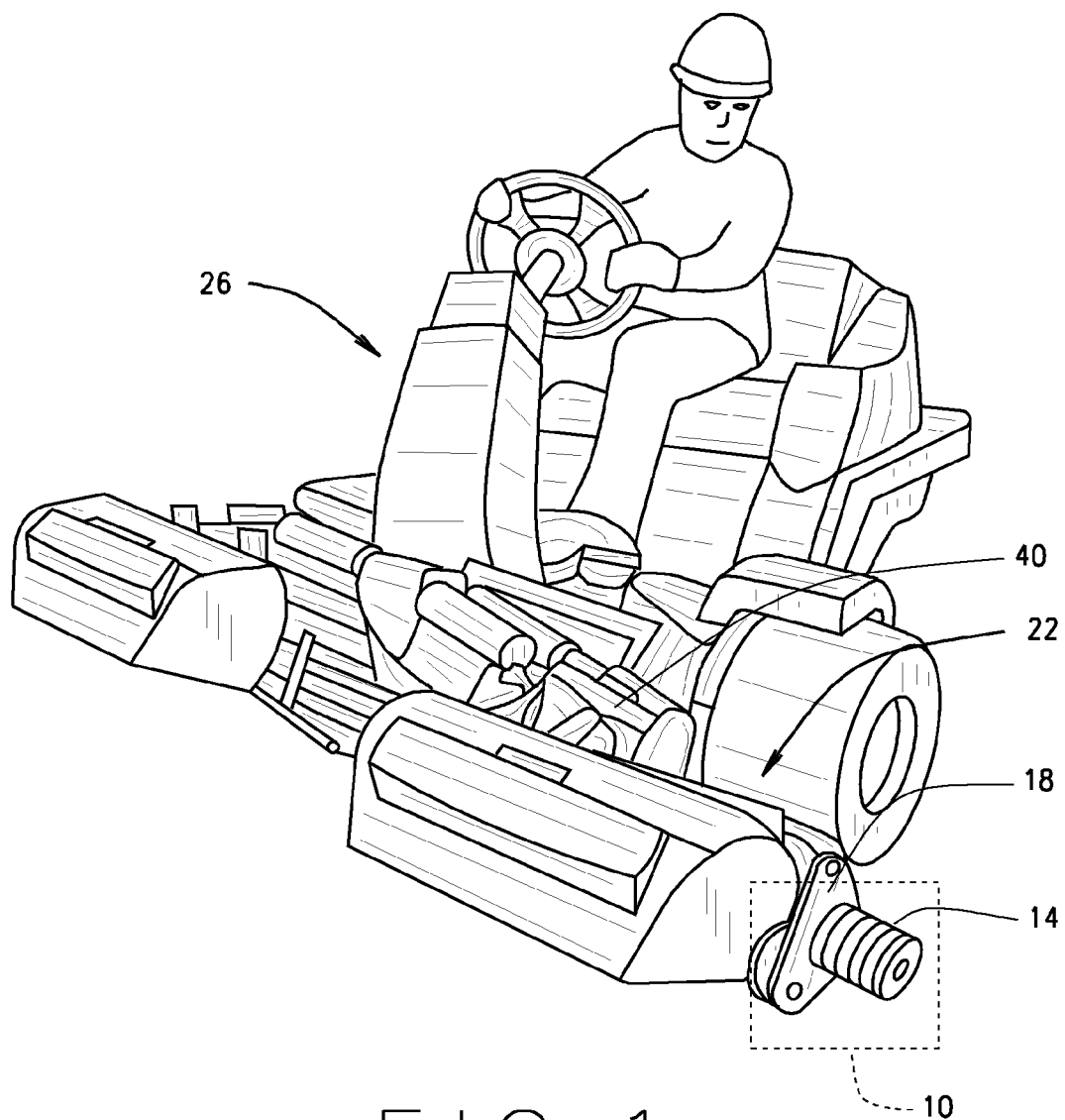
FIG. 1 is an exemplary illustration of a turf-care vehicle having a motor connection system for quickly and easily attaching and removing a motor to and from a reel assembly of the turf-care vehicle without the use of tools, in accordance with various embodiments of the present disclosure.

The following description is merely exemplary in nature and is in no way intended to limit the present teachings, application, or uses. Throughout this specification, like reference numerals will be used to refer to like elements.

Figure 2A:
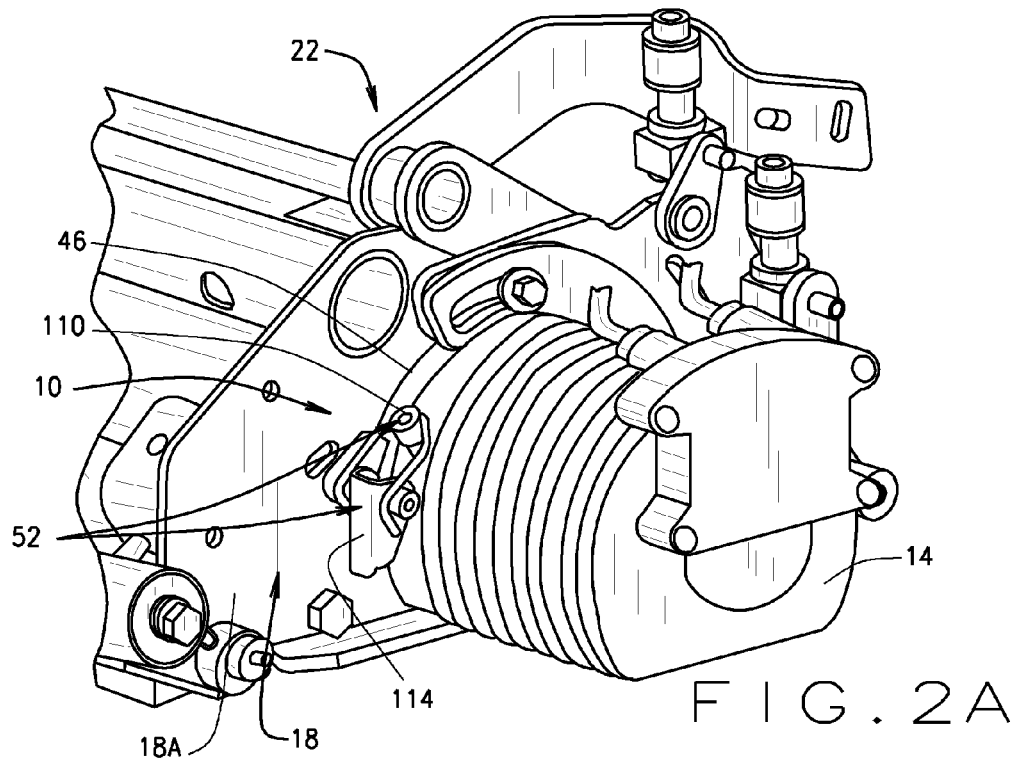
FIG. 2A is an isometric rear view of the motor connection system shown in FIG. 1 being utilized to mount the motor to a side plate of a reel assembly frame, in accordance with various embodiments of the present disclosure.
Figure 2B:
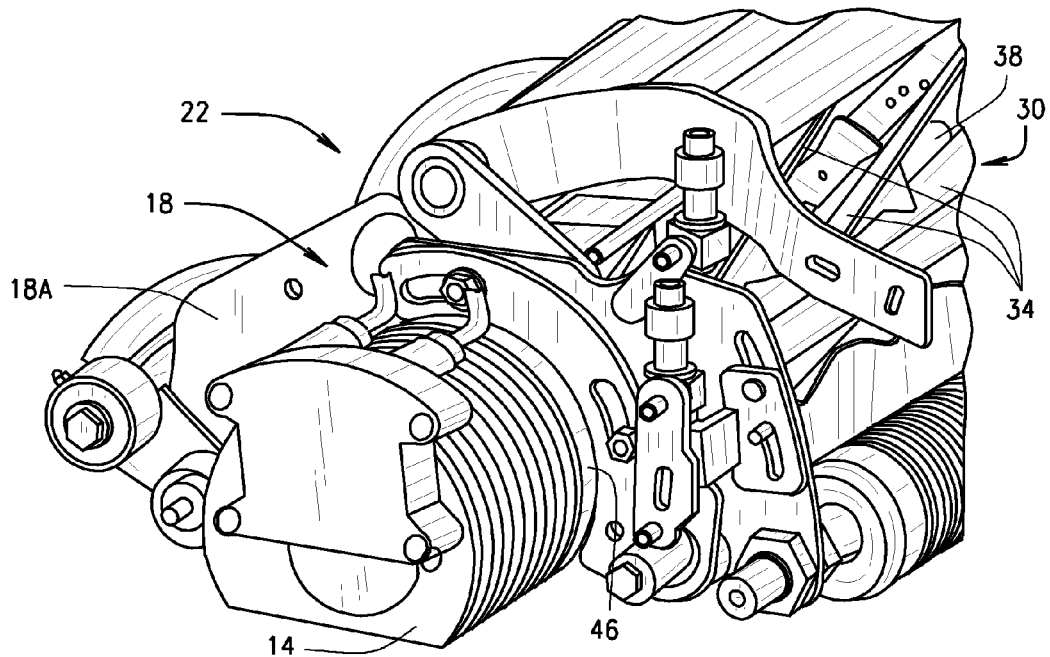
FIG. 2B is and isometric front view of the motor connection system shown in FIG. 1 being utilized to mount the motor to the side plate of a reel assembly frame, in accordance with various embodiments of the present disclosure.

Referring to FIGS. 1, 2A and 2B, the present disclosure provides a motor connection system 10 and method that allows a motor 14 to be quickly and easily mounted to and removed from a frame 18 of a reel assembly 22 of a turf-care vehicle 26 without the use of tools. The motor 14 can be any motor suitable for use with turf-care vehicles, such as turf-care vehicle 26, e.g., an electric or hydraulic motor. When installed and operational, the motor 14 is removably mounted to the reel assembly frame 18 via the motor connection system 10, as described further below, and operably connected to a reel 30 rotatably mounted within the reel assembly frame 18. The reel 30 comprises a plurality of grass cutting blades 34 helically disposed about a shaft 38 (best shown in FIG. 2B) and is rotationally driven by the motor 14 during grass cutting operation of the vehicle 26. In order to perform maintenance on the reel 30, e.g., sharpen the blades 34, or perform other maintenance on the reel assembly 22, the motor 14 can be quickly and easily removed from the frame 18 without the use of tools, via the motor connection system 10, whereafter the reel assembly 22 can be disconnected from a reel assembly suspension 40 of the vehicle 26.

Although the turf-care vehicle 26 is exemplarily illustrated in FIG. 1 to be a riding greens mower, the motor connection system 10 can be implemented on any turf-care vehicle having a reel assembly that is substantially the same as or similar to the reel assembly 22 exemplarily illustrated in FIG. 1, e.g., walking greens mowers, trim mowers and fairway mowers.

Referring now to FIGS. 3, 4A, 4B and 4C, in various embodiments, the motor connection system 10 includes a plurality of shoulder bolts 42 that are connected to and longitudinally extend (relative to a longitudinal axis A of the motor 14) from a mounting end 44 of the motor 14, a bearing housing 46 including a plurality of self-tightening keyhole slots 48 extending through a motor mounting plate 50 of the bearing housing 46, and a retaining mechanism 52 that is structured and operable to retain the motor 14 in a Home position (described below). Each shoulder bolt 42 comprises a shaft 54 and a head 56 disposed at a distal end of the shaft 54. At least a bottom portion of the head 56, e.g., a shoulder of the head 56, has an outside diameter D that is greater than the outside diameter E of shaft 54 and has an underside 58 that is, in various embodiments, substantially flat.

Each keyhole slot 48 comprises a head opening 62 formed at a proximal end 64 of the keyhole slot 48 and a shaft channel 66 extending from the head opening 62 to a distal end 68 of the keyhole slot 48. The head opening 62 is sized to accommodate the head 56 of a respective shoulder bolt 42 such that the shoulder bolt 42 can be inserted and removed from the keyhole slot 48 by passing the shoulder bolt head 56 through the head opening 62. For example, in various implementations, the head opening 62 can have a diameter $D^+$ that is slightly larger than (e.g., 1.0-4.0 mm larger than) the diameter D of the shoulder bolt head 56. The shaft channel 66 is sized to be smaller than the head 56 of a respective shoulder bolt 42 such that the shoulder bolt head 56 cannot pass through the shaft channel 66. However, the shaft channel 66 is sized to be large enough such that the shaft 54 of the shoulder bolt 42 can be transitioned along a length L of the shaft channel 66. For example, in various implementations, the shaft channel 66 can have a width $E^+$ that is slightly larger than (e.g., 1.0-3.0 mm larger than) the diameter E of the shoulder bolt shaft 54.

Importantly, as best illustrated in FIGS. 4B and 4C, each keyhole slot 48 further comprises ramped interior bezel, or ledge, 70 formed along an upper edge (relative to the orientation of the keyhole slots 48 shown in FIGS. 4B and 4C) of the shaft channel 66. A proximal end 74 of the bezel 70 is disposed at and opens into the head opening 62. The bezel 70 then extends from the head opening 62 along both sides of the shaft channel 66 and around the distal end 68 of the keyhole slot 48 where it terminates at a bezel distal end 78. Particularly, the bezel 70 includes an intermediate ramped portion 82 that extends along opposing sides of the shaft channel 66 and terminates at a plateau portion 86 that is disposed around the keyhole slot distal end 68 and defines the bezel distal end 78. The ramped portion 82 is inclined from a first end 82A (i.e., the proximal end 74 of the bezel 70) to a second end 82B at an incline angle β that, in various embodiments, is between 5° and 15°. More specifically, the first end 82A of the ramped portion 82 has a depth M that is greater than a depth P at the second end 82B of the ramped portion 82.

As described above, the shoulder bolts 42 are connected to and longitudinally extend from the mounting end 44 of the motor 14. The shoulder bolts 42 can be connected to the mounting end 44 of the motor in any desirable manner. For example, in various embodiments the shoulder bolts 42 can be screwed, threaded or press-fit into threaded or non-threaded bores formed in the motor mounting end 44 during fabrication of the motor 14. Alternatively, in various other embodiments, the motor 14 can be retrofit with the shoulder bolts 42, whereby the shoulder bolts 42 are screwed, threaded or press-fit into threaded or non-threaded bores that are formed, e.g., drilled and/or tapped, in the motor mounting end 44 subsequent to fabrication of the motor 14. Additionally, the shoulder bolts 42 can be fabricated as a single unitary component wherein the head 56 and shaft 54 are integrally formed. Or, the shoulder bolts 42 can be fabricated as assemblies wherein the head 56 and shaft 54 are fabricated separately and subsequently assembled/connected, e.g., such a shoulder bolt assembly can comprises a threaded bolt, a washer and a shaft sleeve disposed over the shaft of the threaded bolt. Also, in various embodiments, the head 56 can be of a multi-part construction comprising a washer and a button that are connected to the shaft 54. Still further, the head 56 of each shoulder bolt 42 can have any suitable shape having an outside diameter that is greater than an outside diameter of the shaft 54, e.g., the head 56 can be cylindrically shaped, cube shaped, etc. Still yet further, although the underside 58 of the head 56 is exemplarily illustrated in FIG. 4A as being substantially flat, it is envisioned that in various embodiments, the underside 58 can be concave or convex to accommodate various tolerance stacks between the shoulder bolt 42 and the keyhole bezels 70. Even further, in various embodiments, the shoulder bolt can further include a stabilizing structure (not shown) disposed near the end of the shaft 54 where the shaft 54 engages a face 44A of the mounting end 44 of the motor 14. In such embodiments, the stabilizing structure would have a larger outside diameter than the shaft 54 and contact the motor mounting end face 44A such that it provides rigidity and stability to the shoulder bolt 42.

Furthermore, although throughout the various figures the motor connection system 10 is shown to include two shoulder bolts 42, it is envisioned that in various embodiments the motor connection system 10 can include more than two shoulder bolts 42 as needed to securely retain the motor 14 to the bearing housing 46, as described below. In such embodiments, the bearing housing 46 would include a number of keyhole slots 48 equal to the number of shoulder bolts 42. Still further, the shoulder bolts 42 can be disposed on and longitudinally extend from any desired location on the motor mounting end 44. However, in various embodiments, as exemplarily shown in FIG. 3, the shoulder bolts 42 are located away from a centerline of the motor mounting end 44, e.g., above the centerline of the face 44A of the motor mounting end 44. Therefore the center of gravity of the motor 14 will be below the connection points of the shoulder bolts 42 and keyhole slots 46 when the motor 14 is connected to the bearing housing 46, as described below. Additionally, such off centerline location of the shoulder bolts 42 will assist in providing multi-directional stability of the motor 14 when the motor 14 is connected to the bearing housing 46, as described below.

Figure 3:
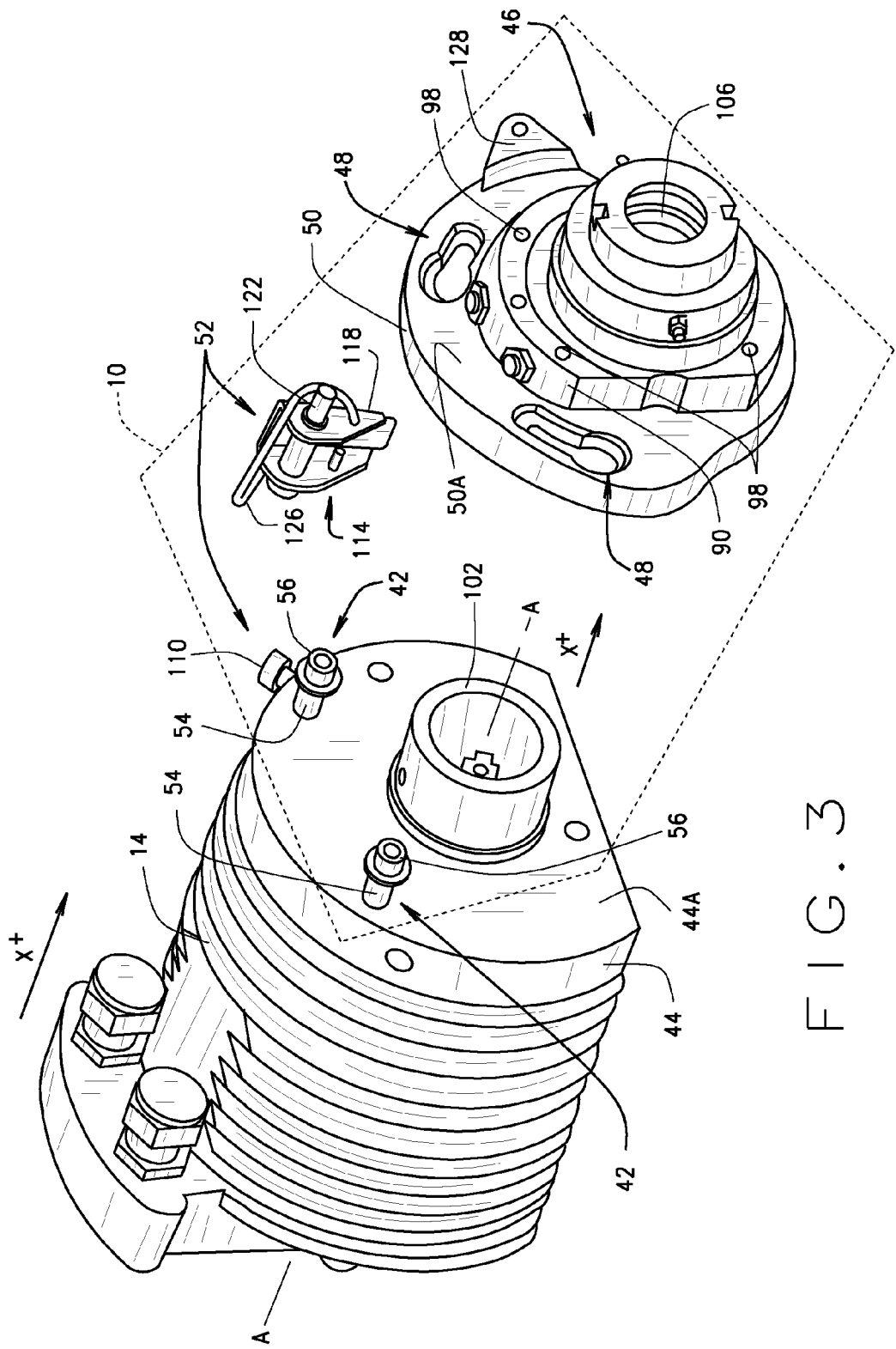
FIG. 3 is an exploded view of the motor connection system shown in FIG. 1, in accordance with various embodiments of the present disclosure.
Figure 5A:
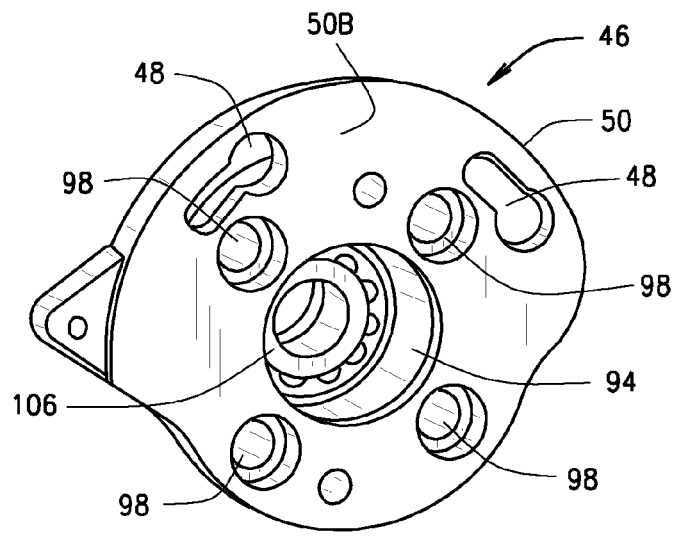
FIG. 5A is an isometric view of the bearing housing of the motor connection system shown in FIG. 3 having a motor mount face showing, in accordance with various embodiments of the present disclosure.
Figure 5B:
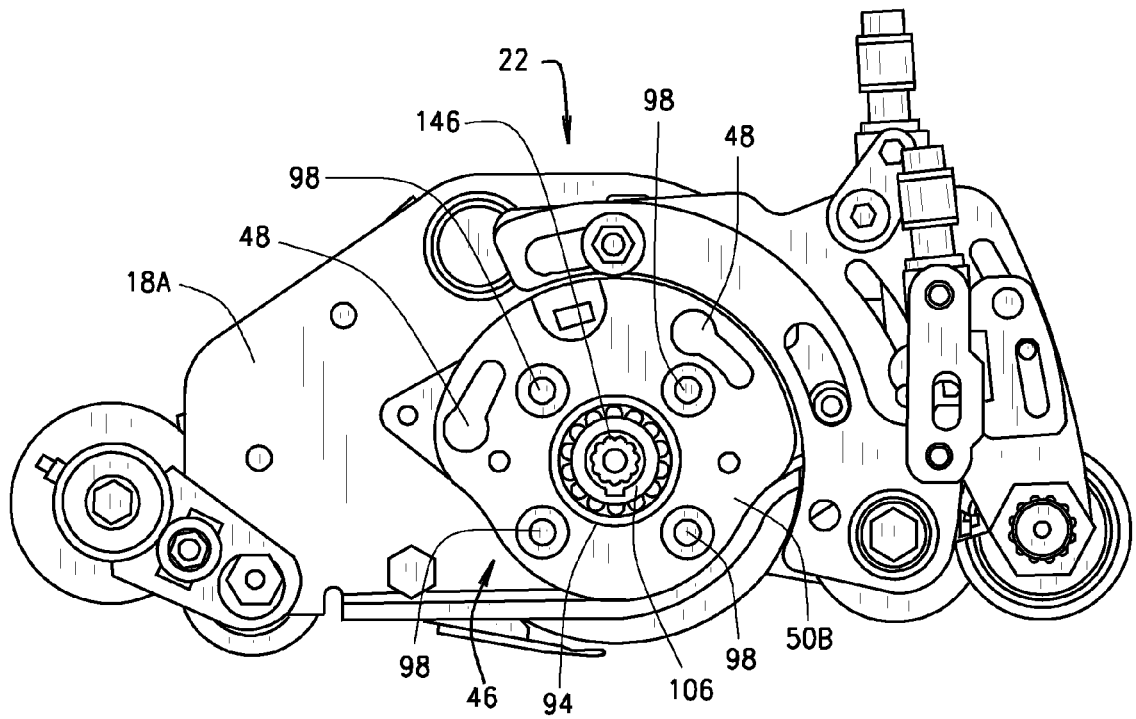
FIG. 5B is a side view of the turf-care vehicle reel assembly having the bearing housing mounted to the side plate of a reel assembly frame, in accordance with various embodiments of the present disclosure.

Referring now to FIGS. 3, 5A and 5B, as described above the bearing housing 46 includes the motor mounting plate 50 and the plurality of self-tightening keyhole slots 48 extending through the motor mounting plate 50. The bearing housing 46 additionally includes a frame mounting offset structure 90 extending from a backside, or frame side, 50A of the motor mounting plate 50 and a centering hole 94 extending though the motor mounting plate 50. The frame mounting offset structure 90 is structured and operable to provide a gap or space adjacent, i.e., behind, each keyhole slot 48 to accommodate the shoulder bolt head 56 of each respective shoulder bolt 42 when the bearing housing 46 is mounted to a side plate 18A of the reel assembly frame 18, as described below. For example, in various embodiments, the frame mounting offset structure 90 provides a gap or space between the side plate 18A and at least the portions of the motor mounting plate 50 comprising the keyhole slots 48.

It should be understood that although the bearing housing motor mounting plate 50 and frame mounting offset structure 90 are generally described herein as independent structures, in various embodiments, the bearing housing 46 is fabricated as a single unitary structure wherein the motor mounting plate 50 is integrally formed with the frame mounting offset structure 90. However, it is envisioned that the motor mounting plate 50 and the frame mounting offset structure 90 can be fabricated separately and subsequently connected, joined, bonded or laminated together.

The centering hole 94 is structured and operable to receive a centering structure 102 (sometimes referred to as a pilot) longitudinally extending (relative to the longitudinal axis A of the motor 14) from the mounting end 44 of the motor 14 to align and center the motor 14 with the bearing housing 46 and prevent radial movement of the motor 14 when the motor 14 is connected to the bearing housing 46, via the shoulder bolts 42 and keyhole slots 48, as described below. Particularly, the centering hole 94 and the centering structure 102 are sized such that the centering structure 102 fits easily and cooperatively within the centering hole 94 when the motor 14 is connected to the bearing housing 46, via the motor connection system 10. That is, the centering hole 94 and the centering structure 102 are fabricated such that an outside diameter of the centering structure 102 is slightly smaller than an inside diameter of the centering hole 94. Accordingly, the centering structure 102 cooperatively fits within the centering hole 94 such that lateral, or radial, movement of the motor 14 is prevented when the motor 14 is connected to the bearing housing 46, via the motor connection system 10. Furthermore, the disposition of the centering structure 102 within the centering hole 94 ensures that a rotor shaft (not shown) of the motor 14, the reel shaft 38, and a coupler 146 (generally shown in FIG. 5B) are substantially collinearly aligned, whereby side loading of the bearings in a bearing assembly 106 (shown in FIGS. 5A and 5B) is avoided. The coupler 146 is structured and operable to transmit torque from the motor shaft to the reel shaft 38.

Referring now to FIGS. 2A through 5B, to implement and utilize the motor connection system 10 to operatively connect the motor 14 to the reel assembly 22 (and to the coupler 146), the bearing housing 46 is first mounted to the side plate 18A of the reel assembly frame 18 such that the frame mounting offset structure 90 contacts the side plate 18A. Additionally, the bearing housing 46 is mounted to the side plate 18A such that the bearing assembly 106 of the bearing housing 46 is operatively connected with the reel shaft 38 of the reel 30. The bearing housing 46 can be securely mounted to the reel assembly side plate 18A using any desirable fastening means. For example, in various embodiments, the bearing housing 46 can be bolted to the side plate 18A using bolts (not shown) that are inserted through frame mounting holes 98 in the bearing housing 46 and threaded into corresponding threaded fasteners, nuts, or apertures (not shown) in the side plate 18A. As described above, the frame mounting offset structure 90 provides a gap or space adjacent, i.e., behind, the keyhole slots 48. The gap or space accommodates the heads 56 of the shoulder bolts 42 such that the shoulder bolt heads 56 can be freely inserted through the keyhole slots 48 and be transitioned along the ramped bezel 70, as described below, without contacting the side plate 18A or any other structure adjacent, i.e., behind, the keyhole slots 48 once the bearing housing is mounted to the side plate 18A.

Once the bearing housing 46 is mounted to the side plate 18A, the motor 14 is positioned such that the heads 56 of each shoulder bolt 42 align with the head opening 62 of a corresponding keyhole slot 48 and the centering structure 102 of the motor 14 aligns with the centering hole 94 of the bearing housing 46. Subsequently, the motor 14 is advanced toward the bearing housing 46, in the $X^+$ direction (shown in FIGS. 3 and 4C) such that the shoulder bolt heads 56 are inserted through the keyhole slots 48, via the head openings 62, and the centering structure 102 is received within the centering hole 94. Moreover, the motor 14 is advanced toward the bearing housing 46 until the face 44A of the motor mounting end 44 lightly or loosely contacts and is substantially flush with a front or motor mount face 50B of the bearing housing 46. Additionally, the motor 14 is advanced toward the bearing housing 46 such that the rotor shaft (not shown) of the motor 14 operatively connects with the coupler 146 and/or the shaft 38 of the reel 30 when the motor 14 is positioned with the motor mounting end face 44A lightly or loosely contacting the bearing housing front face 50B.

Importantly, the shoulder bolts 42 are constructed such that when the shoulder bolts 42 are disposed in the mounting end 44 of the motor 14, as described above, a length X of each shoulder bolt shaft 54 extends beyond the face 44A of the motor mounting end 44. More specifically, the length X is the distance between the motor mounting end face 44A and the underside 58 of each shoulder bolt head 56. The length X is substantially equal to, or slightly greater than (e.g., 1.0-4.0 mm greater than) a distance Y (shown in FIG. 4C) between the front face 50B of the bearing housing 46 and the first end 82A of the ramped portion 82 of the bezel 70. Therefore, when the shoulder bolt heads 56 are inserted through the head openings 62 of the keyhole slots 48 and the motor mounting end face 44A lightly or loosely contacts and is substantially flush with the bearing housing front face 50B, the underside 58 of each shoulder bolt head 56 is positioned adjacent and slightly past the first end 82A of the ramped portion 82 of the bezel 70 (i.e., slightly above the first end 82A relative to the orientation of the keyhole slots 48 shown in FIGS. 4B and 4C).

Subsequently, the motor 14 is rotated about its longitudinal axis A such that each shoulder bolt shaft 54 is advanced into the shaft channel 66 of the respective keyhole slot 48. Moreover, as the motor 14 is rotated, the underside 58 of each shoulder bolt head 56 contacts the bezel ramped portion 82 at, or approximately at, the first end 82A and begins to slide and be advanced along the bezel ramped portion 82. Still further, as the motor 14 is rotated and the shoulder bolt heads 56 traverse along the bezel ramped portion 82 from the first end 82A to the second end 82B, the incline of the bezel ramped portion 82 forces the shoulder bolt heads 56, and consequently the motor 14, to move in the X$^+$ direction (shown in FIGS. 3 and 4C). Therefore, as the motor 14 is rotated, it is continuously forced or pulled in the X$^+$ direction until the shoulder bolt head 56 is seated in the plateau portion 86 of the bezel 70 and shoulder bolt head underside 58 mates flush with the surface of the plateau portion 86, referred to herein as the Home position. Hence, to fully connect the motor 14 to the bearing housing 46, and consequently to the reel assembly frame 18, the motor is rotated to the Home position (as shown in FIGS. 2A and 2B). When the motor is rotated to the Home position, the shoulder bolt shafts 54 contact the distal ends 68 of the keyhole slots 48 and/or the shoulder bolt heads 56 contact the distal ends 78 of the bezels 70.

As used herein, rotation of the motor 14 means physical rotation of the entire motor 14, i.e., rotation of the motor housing or body, relative to the bearing housing 46. Such use does not mean operational rotation of the motor rotor or other internal motor components (not shown or discussed in the present disclosure) during operation of the motor 14.

Importantly, when the motor 14 is rotated to the Home position, the movement of the motor in the X$^+$ direction, caused by the force applied to the shoulder bolt heads 56 by the keyhole ramped bezels 70, causes the motor mounting end face 44A to mate substantially flush with the bearing housing front face 50B such that the motor 14 is tightly and substantially rigidly connected, held and secured to the bearing housing 46. That is, when the motor 14 is tightly and substantially rigidly connected to the bearing housing 46, as described above, there is no or very little space between the motor mounting end face 44A and the bearing housing front face 50B, therefore there will be no or very little wobble, jiggle or lateral movement of the motor 14 on the bearing housing 46. It should be noted that, in addition to the shoulder bolts 42 and keyhole slots 48, the disposition of the centering structure 102 within the centering hole 94 provides additional connective support of the motor 14 on the bearing housing 46.

Furthermore, the keyhole slots 48 are disposed and oriented within the bearing housing 46 such that rotational forces applied on the motor 14 by torque generated during operation of the motor 14 will be in same direction as the motor 14 is rotated to connect the motor 14 to the bearing housing 46 as described above. Accordingly, since the shoulder bolt shafts 54 contact the distal ends 68 of the keyhole slots 48 and/or the shoulder bolt heads 56 contact the distal ends 78 of the bezels 70 when the motor 14 is rotated to the Home position, the motor 14 will not rotationally move relative to the bearing housing 46 due to motor torque generated during operation of the motor 14 once the motor 14 has been placed in the Home position. It should be noted that, to accommodate the arced movement of the shoulder bolts 42 as the motor 14 is rotated to the Home position, the shaft channels 66 of the keyhole slots 48 are also slight arced having a center of radius at the center of the centering hole 94.

Finally, once the motor 14 is connected to the bearing housing 46 and rotated to the Home position, the retaining mechanism 52 is engaged to secure the motor 14 in the Home position, i.e., prevent rotation of the motor 14 away from the Home position. For example, the retaining mechanism 52 will prevent rotation of the motor 14 away from the Home position due to motor 'kick back' when the motor is turned off, or due to performance of a blade sharpening procedure commonly known as 'backlapping', or due to performance of a grass cutting procedure commonly known as 'reverse verticutting'. The retaining mechanism 52 can be any connection system that is suitable to fixedly retain the motor 14 in the Home position, i.e., to prevent rotation of the motor 14 away from the Home position.

For example, as exemplarily illustrated in FIGS. 2A and 3, in various embodiments the retaining mechanism 52 can comprise a latch stud 110 connected to and radially extending from the mounting end 44 of the motor 14, and an over-center latch 114 pivotally connected to the bearing housing 46. The over-center latch 114 includes a latch body 118 that is pivotally connected to the bearing housing 46 via a pivot pin 122, and a latch loop 126 pivotally connected to the body 118. To fixedly retain the motor 14 in the Home position, the latch body 118 is rotated about the pivot pin 122 in a first direction such that the latch loop 126 is positioned over the latch stud 110. Subsequently, the latch body 118 is rotated about the pivot pin 122 in a second direction (opposite the first direction) to a latched position (shown in FIG. 2A). As the latch body 118 is rotated in the second direction toward the latched position, the latch loop 126 engages the latch stud 110 and applies a rotational force to the motor 14 in same direction as the motor 14 is rotated to the Home position. Hence, when the latch loop 126 is engaged with the latch stud 110, and the latch body 118 is placed in the latched position, the motor 14 is securely retained in the Home position.

In various embodiments, the latch body 118 can be adjustably connected to the bearing housing 46, such that tension applied to the latch loop 126 and/or the latch body 118 when the latch body 118 is rotated in the second direction will not distort or bend the latch loop 126 and/or the latch body 118. For example, in various embodiments, a mounting ear 128 of the bearing housing 46, to which the latch body 118 is pivotally connected via the pivot pin 122, can be adjustably mounted to the motor mounting plate 50 of the bearing housing 46, whereby the mounting ear 128 can be moved along an arc near or at the perimeter of the motor mounting plate 50 and fixed in a desired location, e.g., fixed using a set screw, thereby adjusting the tension applied on the latch stud 110 by the over-center latch 114. Or, in various other embodiments, the latch stud 110 can be adjustably mounted to the mounting end 44 of the motor 14, whereby the latch stud can be moved along an arc near or at the perimeter of the motor mounting end 44 and fixed in a desired location, thereby adjusting the tension applied on the latch stud 110 by the over-center latch 114.

Figure 8:
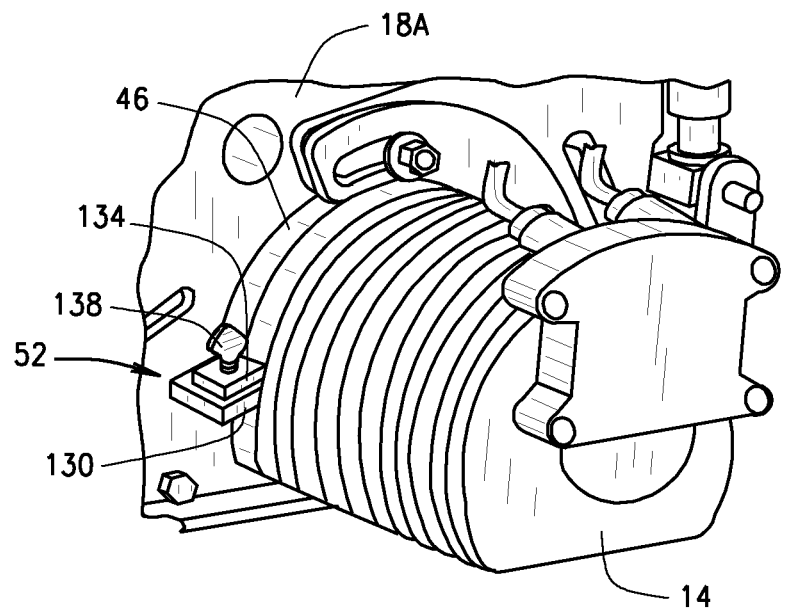
FIG. 8 is an isometric view of the motor connection system shown in FIG. 1 having a thumb screw retaining fixture, in accordance with various embodiments of the present disclosure Corresponding reference numerals indicate corresponding parts throughout the several views of drawings.

Alternatively, as exemplarily illustrated in FIG. 8, in various embodiments the retaining mechanism 52 can comprise a first retention tab 130 extending radially from the bearing housing 46 and including a threaded aperture (not shown), a second retention tab 134 extending radially from the mounting end 44 of the motor 14 and including a bore therethrough (not shown), and a thumb or wing screw 138. When the motor 14 is rotated to the Home position the first and second retention tabs 130 and 134 will be positioned adjacent each other with a gap or space therebetween. Thereafter, to fixedly retain the motor 14 in the Home position, a threaded shaft (not shown) of the thumb screw 138 is inserted through the bore in the second retention tab 134 and threadingly engaged with the threaded aperture in the first retention tab 130. The thumb screw 138 is then turned, i.e., tightened, to advance the thumb screw threaded shaft through the first retention tab treaded aperture, thereby pulling the second retention tab 134 into closer proximity to the first retention tab 134. Consequently, a rotational force is applied to the motor 14 in same direction as the motor 14 is rotated to the Home position. Hence, when the thumb screw 138 is tightened the motor 14 is securely retained in the Home position.

To disengage and remove the motor 14 from the bearing housing 46, and consequently from the reel assembly frame 18, the above motor connection procedure is simply reversed. Specifically, to disengage and remove the motor 14, the retaining mechanism 52 is disengaged, the motor 14 is rotated in a direction away from the Home position until the shoulder bolt heads 56 are disposed within the keyhole slot head openings 62. Subsequently, the motor 14 is pulled away from and disengaged from the bearing housing 46.

Referring now to FIGS. 3, 6A, 6B, 7A and 7B as described above, the bearing housing 46 includes the motor mounting plate 50 and the frame mounting offset structure 90 that extends from the backside, or frame side, 50A of the motor mounting plate 50. As described above, the frame mounting offset structure 90 is structured and operable to provide a gap or space adjacent each keyhole slot 48 when the bearing housing 46 is mounted to a side plate 18A of the reel assembly frame 18. Importantly, the gap or space accommodates the heads 56 of the shoulder bolts 42 such that the shoulder bolt heads 56 can be freely inserted through the keyhole slots 48 and be transitioned along the ramped bezel 70 without contacting the side plate 18A or any other structure adjacent the keyhole slots 48 when the bearing housing is mounted to the side plate 18A.

Although the geometry of the motor mounting plate 50 and the frame mounting offset structure 90 can differ depending on the particular turf-care vehicle 26 and reel assembly 22 for which the motor connection system 10 is to be implemented, the basic structure and functionality of bearing housing 46 remains the same throughout all applications. Particularly, regardless of the particular application, each keyhole slot 48 is structured and functions as described above. And, regardless of the particular application, the frame mounting offset structure 90 provides a gap or space adjacent each keyhole slot 48 so that the shoulder bolt heads 56 can be transitioned along the ramped bezel 70 without contacting the side plate 18A or any other structure adjacent the keyhole slots 48.

Figure 6A:
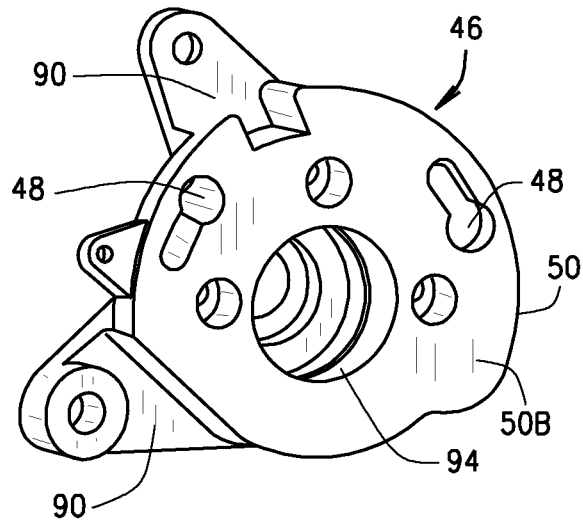
FIG. 6A is an isometric view of a bearing housing of the motor connection system shown in FIG. 1 having the motor mount face showing, in accordance with various other embodiments of the present disclosure.
Figure 6B:
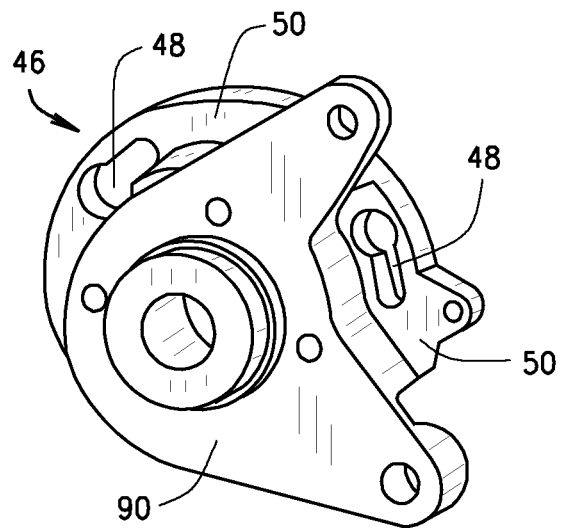
FIG. 6B is an isometric view of the bearing housing shown in FIG. 6A having a frame mount face showing, in accordance with various embodiments of the present disclosure.
Figure 7A:
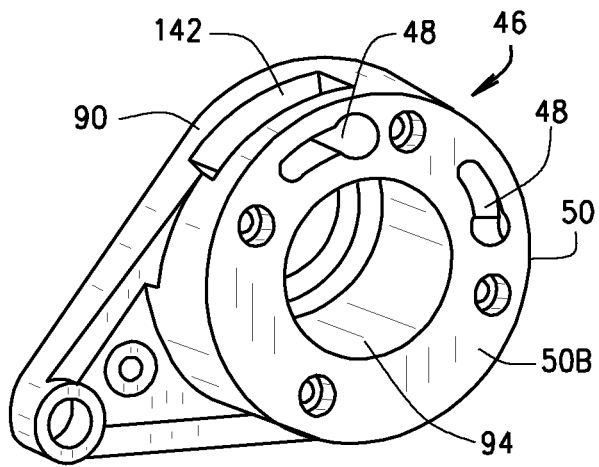
FIG. 7A is an isometric view of a bearing housing of the motor connection system shown in FIG. 1 having the motor mount face showing, in accordance with yet other various other embodiments of the present disclosure.
Figure 7B:
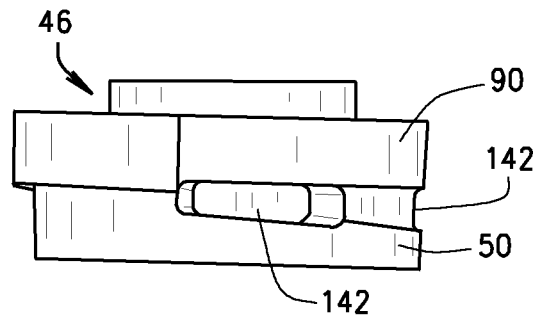
FIG. 7B is top view of the bearing housing shown in FIG. 7A illustrating an internal shoulder bolt head cavity, in accordance with various embodiments of the present disclosure.

For example, in various embodiments, as exemplarily illustrated in FIGS. 3, 6A and 6B, the bearing housing 46 can be constructed such that at least a portion of the frame mounting offset structure 90 has a perimeter that is formed or disposed radially inward from the perimeter of the motor mounting plate 50 such that the backside of each keyhole slot 48 is not covered by the frame mounting offset structure 90. Accordingly, a space or gap is provided adjacent, i.e., behind, each keyhole slot 48 such that the shoulder bolt heads 56 can be freely transitioned along the ramped bezel 70 when the motor 14 is rotated to the Home position. Or, in other various embodiments, as exemplarily illustrated in FIGS. 7A and 7B, the frame mounting structure 90 and the motor mounting plate 50 can have substantially the same shape and footprint. That is, the frame mounting structure 90 can have a perimeter that is formed substantially radially equal to or greater than the perimeter of the motor mounting plate 50. In such embodiments, the bearing housing 46 includes a plurality of radial cavities 142 formed in the frame mounting structure 90 adjacent each keyhole slot 48 such that the shoulder bolt heads 56 can be freely transitioned along the ramped bezel 70 when the motor 14 is rotated to the Home position.

The description herein is merely exemplary in nature and, thus, variations that do not depart from the gist of that which is described are intended to be within the scope of the teachings. Such variations are not to be regarded as a departure from the spirit and scope of the teachings.

What is claimed is:

1. A motor connection system for easy mounting and removal of a motor to and from a reel assembly frame of a turf-care vehicle, said system comprising:
    a plurality of shoulder bolts connected to and longitudinally extending from a mounting end of a motor, each shoulder bolt comprising a shaft and a head disposed at a distal end of the shaft; and
    a bearing housing mountable to a reel assembly frame of a turf-care vehicle, the bearing housing comprising a plurality of self-tightening keyhole slots, each keyhole slot comprising an interior ramped bezel and structured and operable to receive a respective one of the shoulder bolts and to be interoperable with the respective shoulder bolt such that rotation of the motor to a Home position will advance the head of the shoulder bolt along the ramped bezel to self-tighten and secure the motor to the bearing housing.

2. The system of claim 1, further comprising a retaining mechanism structured and operable securely retain the motor in the Home position.

3. The system of claim 2, wherein the retaining mechanism comprises:
    a latch stud connected to and radially extending from the end of the motor; and
    an over-center latch connected to the bearing housing, the over-center latch structured and operable to engage the latch stud to securely retain the motor in the Home position.

4. The system of claim 2, wherein the retaining mechanism comprises:
    a first retention tab extending radially from the bearing housing;
    a second retention tab extending radially from the mounting end of the motor; and
    a thumb screw structured and operable to extend through an orifice in the first retention tab and threadingly engage a threaded aperture in the second retention tab to fixedly connect the first and second retention tabs to securely retain the motor in the Home position.

5. The system of claim 1, wherein each ramped interior bezel comprises a ramped portion and a non-ramped plateau formed at a distal end of the ramped portion, the plateau structured and operable to mate flush with an underside of the respective shoulder bolt head when the motor is rotated to the Home position.

6. The system of claim 1, wherein the bearing housing further comprises:
    a motor mounting plate having the keyhole slots extending therethrough and having a motor mount face to which a face of the motor mounting end mates substantially flush with when the motor is in the Home position;
    a frame mounting offset extending from a frame side of the motor mounting plate opposite the motor mount face, the frame mounting offset structured and operable to mount the bearing housing to the reel assembly frame and provide a space adjacent each keyhole slot to accommodate the heads of the shoulder bolts; and
    a centering hole formed in the center of a motor mounting plate, the centering hole structured and operable to receive a centering structure extending longitudinally from the mounting end of the motor.

7. The system of claim 6, wherein the at least a portion of the frame mounting offset has a perimeter that is formed radially inward from a perimeter of the motor mounting plate such that a backside of each keyhole is uncovered by the frame mounting offset to provide the space adjacent each keyhole slot to accommodate the heads of the shoulder bolts.

8. The system of claim 6, wherein the frame mounting structure has a perimeter that is formed substantially radially equal to or greater than the perimeter of the motor mounting plate such that a backside of each keyhole is covered by the frame mounting structure, and includes a plurality of radial cavities that provide the provide the space adjacent each keyhole slot to accommodate the heads of the shoulder bolts.

9. A reel assembly for a turf-care vehicle, said assembly comprising:
   a frame; and
   a motor connection system for easy mounting and removal of a motor to and from the reel assembly frame, said motor connection system comprising:
      a plurality of shoulder bolts connected to and longitudinally extending from a mounting end of a motor, each shoulder bolt comprising a shaft and a head disposed at a distal end of the shaft;
      a bearing housing mountable to a reel assembly frame of a turf-care vehicle, the bearing housing comprising a plurality of self-tightening keyhole slots, each keyhole slot comprising an interior ramped bezel and structured and operable to receive a respective one of the shoulder bolts and to be interoperable with the respective shoulder bolt such that rotation of the motor to a Home position will advance the head of the shoulder bold along the ramped bezel to self-tighten and secure the motor to the bearing housing; and
      a retaining mechanism structured and operable securely retain the motor in the Home position.

10. The system of claim 6, wherein the bearing housing further comprises:
    a motor mounting plate having the keyhole slots extending therethrough and having a motor mount face to which a face of the motor mounting end mates substantially flush with when the motor is in the Home position;
    a frame mounting offset extending from a frame side of the motor mounting plate opposite the motor mount face, the frame mounting offset structured and operable to mount the bearing housing to the reel assembly frame and provide a space adjacent each keyhole slot to accommodate the heads of the shoulder bolts; and
    a centering hole formed in the center of a motor mounting plate, the centering hole structured and operable to receive a centering structure extending longitudinally from the mounting end of the motor.

11. The system of claim 10, wherein at least a portion of the frame mounting offset has a perimeter that is formed radially inward from a perimeter of the motor mounting plate such that a backside of each keyhole is uncovered by the frame mounting offset to provide the space adjacent each keyhole slot to accommodate the heads of the shoulder bolts.

12. The system of claim 10, wherein the frame mounting structure has a perimeter that is formed substantially radially equal to or greater than the perimeter of the motor mounting plate such that a backside of each keyhole is covered by the frame mounting structure, and includes a plurality of radial cavities that provide the provide the space adjacent each keyhole slot to accommodate the heads of the shoulder bolts.

13. The system of claim 9, wherein the retaining mechanism comprises:
    a latch stud connected to and radially extending from the end of the motor; and
    an over-center latch connected to the bearing housing, the over-center latch structured and operable to engage the latch stud to securely retain the motor in the Home position.

14. The system of claim 9, wherein the retaining mechanism comprises:
    a first retention tab extending radially from the bearing housing;
    a second retention tab extending radially from the mounting end of the motor; and
    a thumb screw structured and operable to extend through an orifice in the first retention tab and threadingly engage a threaded aperture in the second retention tab to fixedly connect the first and second retention tabs to securely retain the motor in the Home position.

15. A method for easy mounting and removal of a motor to and from a reel assembly frame of a turf-care vehicle, said method comprising:
    inserting a plurality of shoulder bolts connected to and longitudinally extending from a mounting end of a motor into a plurality of self-tightening keyhole slots formed in a bearing housing mountable to a reel assembly frame of a turf-care vehicle, each shoulder bolt comprising a shaft and a head disposed at a distal end of the shaft, and each keyhole slot comprising a ramped interior bezel;
    rotating the motor to a Home position, whereby the heads of the shoulder bolts are advanced along the ramped interior bezels pulling the motor toward and into contact with the bearing housing, thereby self-tightening and securing the motor to the bearing housing; and
    securing the motor in the Home position utilizing a retaining mechanism structured and operable fixedly connect the motor to the bearing housing once the motor is rotated to the Home position.

16. The method of claim 15, wherein rotating the motor to the Home position comprises rotating the motor until each shoulder bolt shaft contacts a distal end of the respective keyhole slot and an underside of each shoulder bolt head mates flush with a non-ramped plateau formed at the distal end of each respective ramped interior bezel.

17. The method of claim 15, wherein securing the motor in the Home position utilizing a retaining mechanism comprises:
    after the motor is in the Home position, rotating a body of an over-center latch in a first direction to position a loop of the over-center latch adjacent a latch stud connected to and radially extending from the end of the motor, the body pivotally connected to the bearing housing via a pivot pin;
    disposing the latch loop over the latch stud; and
    rotating the body in a second direction, opposite the first direction, to engage the loop with the stud and securely retain the motor in the Home position.

18. The method of claim 15, wherein securing the motor in the Home position utilizing a retaining mechanism comprises, after the motor is in the Home position, securing a first retention tab extending radially from the bearing housing to a second retention tab extending radially from the mounting end of the motor by tightening a thumb screw structured and operable to fixedly connect the first and second retention tabs to securely retain the motor in the Home position.

* * * * *

UNITED STATES PATENT AND TRADEMARK OFFICE
CERTIFICATE OF CORRECTION

PATENT NO.        : 9,204,595 B2                                    Page 1 of 1
APPLICATION NO.   : 14/166917
DATED             : December 8, 2015
INVENTOR(S)       : Linton Linn Lewis It is certified that error appears in the above-identified patent and that said Letters Patent is hereby corrected as shown below:

In the claims
In Column 11, Claim 9, line 28, after the word shoulder replace "bold" with --bolt--.
In Column 11, Claim 10, line 32, after the word claim replace "6" with --9--.

Signed and Sealed this
Twenty-third Day of August, 2016

Michelle K. Lee
*Director of the United States Patent and Trademark Office*